US011999160B2

(12) United States Patent
Sugimoto et al.

(10) Patent No.: US 11,999,160 B2
(45) Date of Patent: Jun. 4, 2024

(54) PRINTING DEVICE INCLUDING FIRST UNIT HAVING PRINTING HEAD AND FIRST FIXING MEMBER, AND SECOND UNIT HAVING PLATEN ROLLER AND SECOND FIXING MEMBER

(71) Applicant: BROTHER KOGYO KABUSHIKI KAISHA, Nagoya (JP)

(72) Inventors: Kiyoshi Sugimoto, Kuwana (JP); Takehiko Inaba, Chita (JP); Ryoya Takahashi, Gifu (JP); Yoshitsugu Tomomatsu, Nagoya (JP); Toshiyuki Furuyama, Chiryu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/146,900

(22) Filed: Dec. 27, 2022

(65) Prior Publication Data

US 2023/0202210 A1 Jun. 29, 2023

(30) Foreign Application Priority Data

Dec. 28, 2021 (JP) ................................ 2021-214623

(51) Int. Cl.
*B41J 11/04* (2006.01)
*B41J 3/407* (2006.01)
*B41J 15/04* (2006.01)

(52) U.S. Cl.
CPC ............ *B41J 11/04* (2013.01); *B41J 3/4075* (2013.01); *B41J 15/046* (2013.01)

(58) Field of Classification Search
None
See application file for complete search history.

(56) References Cited

U.S. PATENT DOCUMENTS

2006/0088360 A1* 4/2006 Watanabe ................ B41J 29/02 400/693
2018/0141326 A1* 5/2018 Beck ...................... B41J 15/042
2019/0030928 A1 1/2019 Kanda et al.

FOREIGN PATENT DOCUMENTS

JP 2002-144648 A 5/2002
JP 2019-26416 A 2/2019

* cited by examiner

*Primary Examiner* — Matthew G Marini
(74) *Attorney, Agent, or Firm* — KENEALY VAIDYA LLP

(57) ABSTRACT

A printing device includes: a first unit including a printing head; and a second unit including a platen roller. The printing head is configured to perform printing on a printing medium. The platen roller is configured to nip the printing medium in cooperation with the printing head for printing and to convey the printing medium. The first unit has a first fixing member for fixing the first unit to an external housing. The first fixing member is provided at at least one of a plurality of outer surfaces of the first unit. The second unit has a second fixing member for fixing the second unit to the external housing. The second fixing member is provided at at least one of a plurality of outer surfaces of the second unit. The first unit and the second unit can be assembled to each other and can be separated from each other.

7 Claims, 6 Drawing Sheets

PRINTING DEVICE INCLUDING FIRST UNIT HAVING PRINTING HEAD AND FIRST FIXING MEMBER, AND SECOND UNIT HAVING PLATEN ROLLER AND SECOND FIXING MEMBER

REFERENCE TO RELATED APPLICATIONS

This application claims priority from Japanese Patent Application No. 2021-214623 filed on Dec. 28, 2021. The entire content of the priority application is incorporated herein by reference.

BACKGROUND ART

A printing device including a thermal head and a platen roller is known in the art. In this printing device, a tape to which a heat-sensitive label is adhered is nipped between the thermal head and the platen roller. The platen roller is configured to convey the tape while pressing the tape against the thermal head. At this time, the thermal head is configured to print a character(s) on the heat-sensitive label by heating the same.

The printing device also includes a main body unit, and a cover. The main body unit is configured to accommodate therein a tape roll formed by winding the tape. The cover is movably supported by the main body unit so as to open and close an opening of the main body unit. The thermal head is provided in the main body unit, while the platen roller is rotatably supported by a platen holder provided on a lower surface of the cover at a front end portion thereof. When the cover opens the opening of the main body unit, the thermal head and the platen roller are positioned away from each other. When the cover closes the opening, the thermal head and the platen roller are positioned close to each other.

DESCRIPTION

In the conventional printing device described above, the cover is provided integrally with the main body unit. Therefore, in a case where the printing device is accommodated in an external housing to be used as an assembly unit, the printing device needs to be assembled to the external housing such that opening/closing movement of the cover is ensured. There arises a problem that the above configuration suppresses freedom of layout of the printing device inside the external housing.

In view of the foregoing, it is an object of the present disclosure to provide a printing device that can improve freedom of layout of the printing device in an external housing.

In order to attain the above and other object, the present disclosure provides a printing device including: a first unit; and a second unit. The first unit includes a printing head configured to perform printing on a printing medium. The first unit has a plurality of outer surfaces. The second unit includes a platen roller configured to nip the printing medium in cooperation with the printing head for printing and to convey the printing medium. The second unit has a plurality of outer surfaces. The first unit further has a first fixing member for fixing the first unit to an external housing. The first fixing member is provided at at least one of the plurality of outer surfaces of the first unit. The second unit further has a second fixing member for fixing the second unit to an external housing. The second fixing member is provided at at least one of the plurality of outer surfaces of the second unit. The first unit and the second unit can be assembled to each other and can be separated from each other.

In the above configuration, both the first unit and the second unit have the fixing members (i.e., the first fixing member and the second fixing member) for fixing the printing device to the external housing. Accordingly, the printing device can be freely fixed to the external housing by fixing the first unit to the external housing or by fixing the second unit to the external housing, according to the use of the external housing. Consequently, since freedom of layout of the printing device in the external housing can be improved, the designer of the external housing can freely design the external housing according to the intended use thereof.

Figure 3:
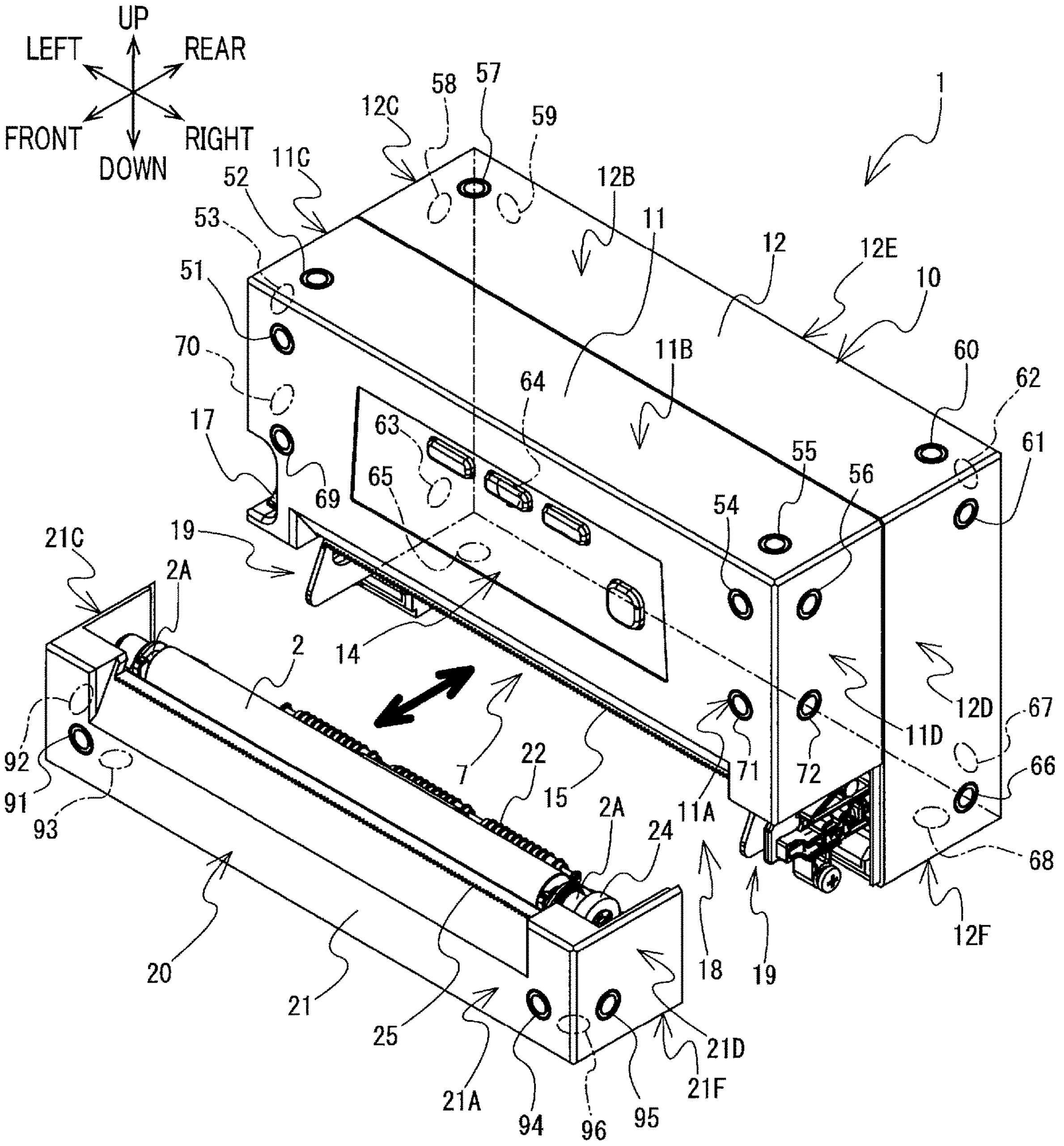

FIG. 3 is a front perspective view of the printing device 1 as viewed from the right-front side thereof, and particularly illustrating a state where a main body unit 10 and a platen unit 20 are separated from each other.

Figure 4:
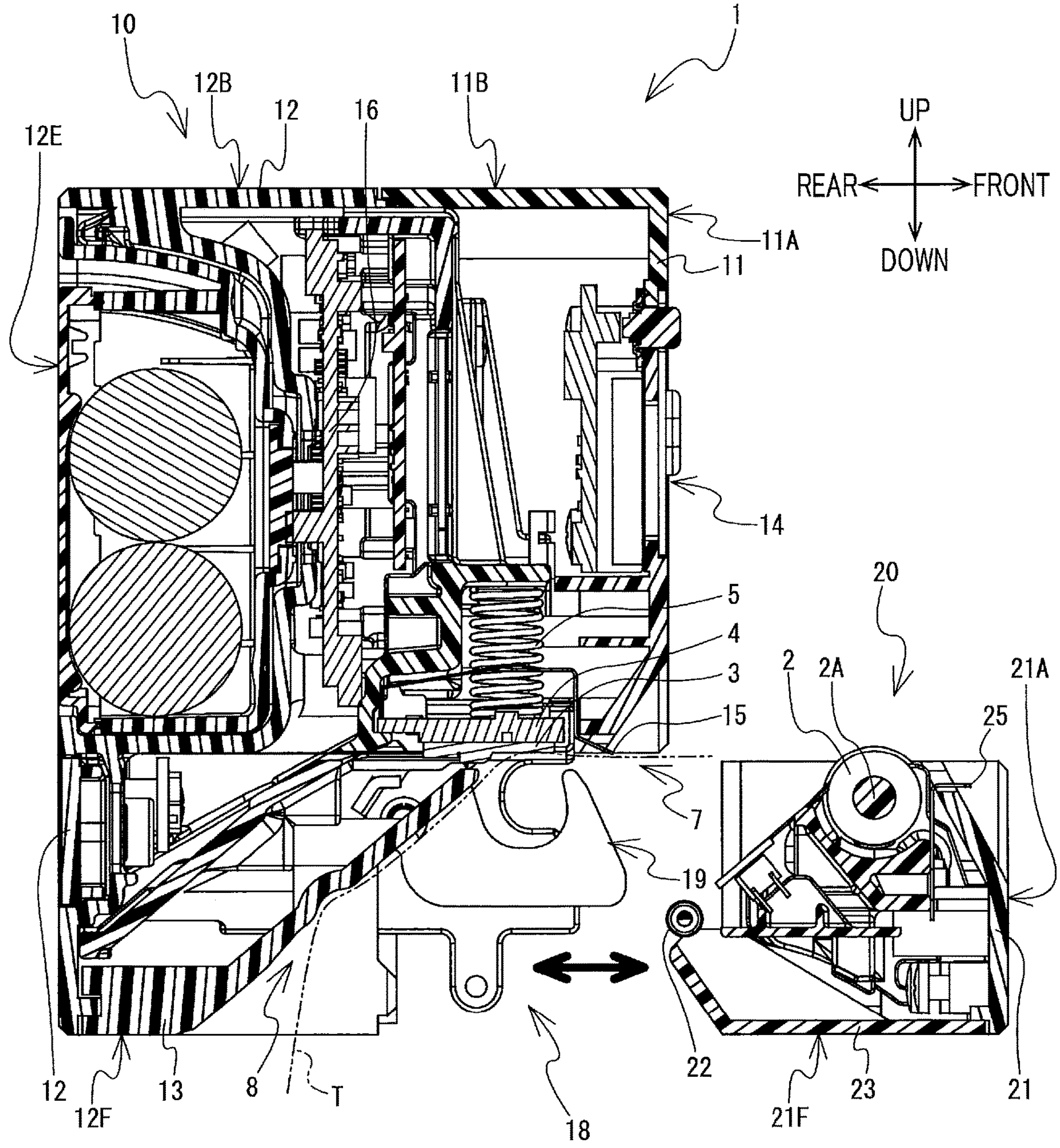

FIG. 4 is a vertical cross-sectional view of the printing device 1 as viewed from the left side thereof, and particularly illustrating the state where the main body unit 10 and the platen unit 20 are separated from each other.

Figure 5:
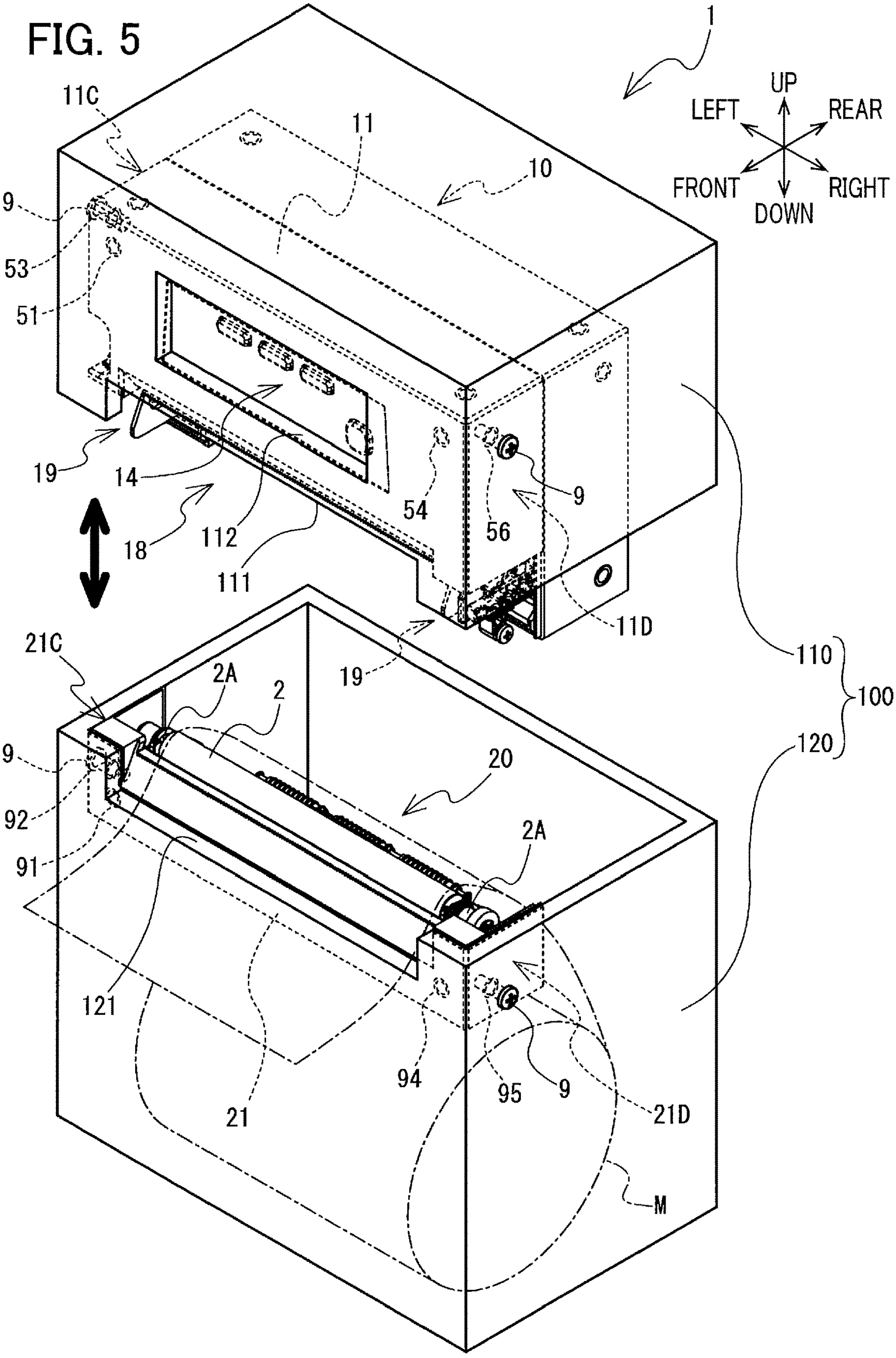

FIG. 5 is a perspective view of the printing device 1, and particularly illustrating a state where the printing device 1 is assembled to an external housing 100 while a discharge opening 7 of the printing device 1 is directed frontward.

Figure 6:
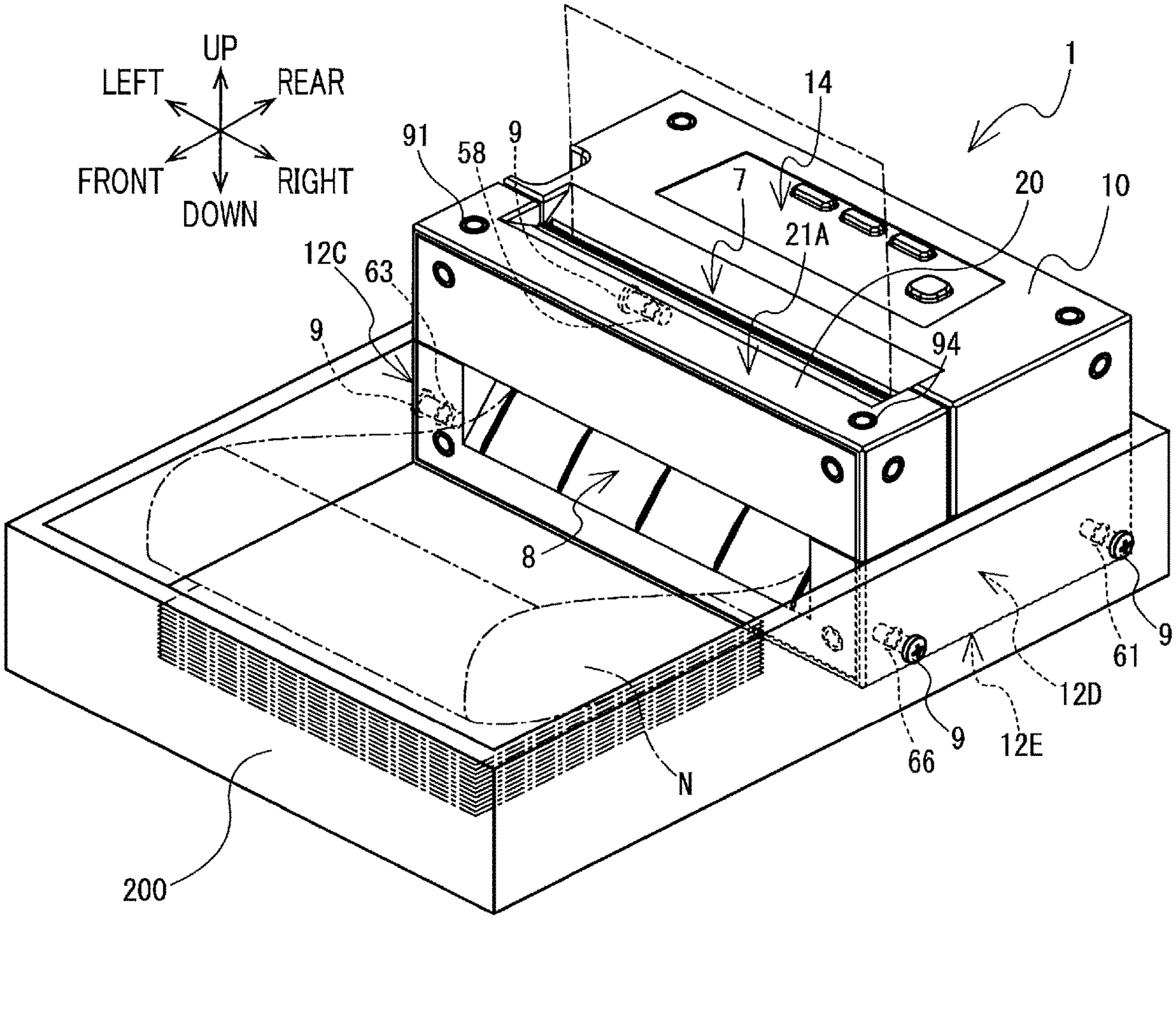

FIG. 6 is a perspective view of the printing device 1, and particularly illustrating a state where the printing device 1 is assembled to an external housing 200 while the discharge opening 7 of the printing device 1 is directed upward.

Hereinafter, one embodiment of the present disclosure will be described while referring to the accompanying drawings. The referenced drawings are merely used to describe the technical features that may be employed in the present disclosure. The configuration, the control, and the like of the apparatus described below are merely examples, and the present disclosure is not intended to be limited to these configurations, control, and the like.

An overview of a printing device 1 will be described. The printing device 1 can be connected to an external terminal (not illustrated) through wired communication using a USB cable, for example, or wireless communication such as a Wi-Fi, a Bluetooth, and the like. The printing device 1 is configured to print, on a printing medium, characters such as letters, figures, and the like on the basis of print data received from the external terminal. "USB" is a registered Japanese trademark of USB Implementers Forum, Inc. "Wi-Fi" is a registered Japanese trademark of Wi-Fi alliance. "Bluetooth" is a registered Japanese trademark of Bluetooth Special Interested Group, Inc.

The printing medium is configured of an elongated heat-sensitive label and is a non-adhesive tape. That is, an adhesive agent is not adhered to the heat-sensitive label. Alternatively, the printing medium may be an adhesive tape whose heat-sensitive label has one side surface to which an adhesive agent is attached and a mount is adhered to the one side surface, or may be a linerless tape to which an adhesive agent is adhered to one side surface of the heat-sensitive label but a mount is not adhered thereto. The printing medium is provided in a form of a roll shape formed by winding the printing medium about a core medium, or in a folded paper shape formed by folding the printing medium. The external terminal is a general-purpose personal computer (PC).

The printing device 1 can be assembled to an external housing 100 (see FIG. 5) for use in the same. The external housing 100 has various types according to various services provided using the printing device 1. The printing device 1 includes outer covers 11, 12, and 21. A plurality of insert nuts for fixing the printing device 1 to the external housing 100 are provided in the outer covers 11, 12, and 21. Specifically, insert nuts 51 to 56, and 69 to 72 are provided in the outer cover 11, insert nuts 57 to 68 are provided in the outer cover 12, and insert nuts 91 to 96 are provided in the outer cover 21 (see FIG. 1). With this configuration, a user can select appropriate orientations for assembling the printing device 1 to the external housing 100 depending on the intended use of the external housing 100.

Next, a configuration of the printing device 1 will be described with reference to FIGS. 1 to 4. Hereinafter, the lower-left side, the upper-right side, the upper-left side, the lower-right side, the upper side, and the lower side in FIG. 1 will be defined as a front side, a rear side, a left side, a right side, an upper side, and a lower side of the printing device 1, respectively.

The printing device 1 has a generally rectangular parallelepiped (box-like) shape elongated in a left-right direction. The printing device 1 includes a main body unit 10, and a platen unit 20. The main body unit 10 includes a printing head 3. The platen unit 20 includes a platen roller 2. The platen unit 20 constitutes a lower-front portion of the printing device 1, and the main body unit 10 constitutes an upper-front portion and a rear portion of the printing device 1. The main body unit 10 and the platen unit 20 can be assembled to each other as a single unit (see FIG. 1), and can be separated from each other as completely separate components (see FIG. 3).

The main body unit 10 includes the outer covers 11 and 12, an operating portion 14, the printing head 3, a driving mechanism (not illustrated), and a control board 16. The outer cover 11 constitutes an upper-front portion of an outer shell of the printing device 1, and has a front surface 11A, an upper surface 11B, a left surface 11C, and a right surface 11D as outer surfaces of the main body unit 10. The front surface 11A constitutes an upper portion of a front surface of the printing device 1, and the upper surface 11B constitutes a front portion of an upper surface of the printing device 1. The left surface 11C constitutes an upper-front portion of a left surface of the printing device 1. The right surface 11D constitutes an upper-front portion of a right surface of the printing device 1. The front surface 11A crosses the front-rear direction. The upper surface 11B crosses the up-down direction. The left surface 11C and the right surface 11D both cross the left-right direction.

The outer cover 12 constitutes a rear portion of the outer shell of the printing device 1, and has an upper surface 12B, a left surface 12C, a right surface 12D, a rear surface 12E, and a bottom surface 12F as outer surfaces of the main body unit 10. The upper surface 12B constitutes a rear portion of the upper surface of the printing device 1. The left surface 12C constitutes a rear portion of the left surface of the printing device 1, and the right surface 12D constitutes a rear portion of the right surface of the printing device 1. The rear surface 12E constitutes a rear surface of the printing device 1, and the bottom surface 12F constitutes a rear portion of a bottom surface of the printing device 1. The upper surface 12B and the bottom surface 12F both cross the up-down direction. The left surface 12C and the right surface 12D both cross the left-right direction. The rear surface 12E crosses the front-rear direction, and is positioned opposite the front surface 11A in the front-rear direction.

At left-front and right-front corner portions of an upper portion of the outer cover 11, the insert nuts 51 to 56 are embedded in corresponding surfaces of the front surface 11A, the upper surface 11B, the left surface 11C, and the right surface 11D. That is, the insert nuts 51 and 54 are embedded in the front surface 11A, the insert nuts 52 and 55 are embedded in the upper surface 11B, the insert nut 53 is embedded in the left surface 11C, and the insert nut 56 is embedded in the right surface 11D. The insert nuts 69 to 72 are provided below the insert nut 51 of the front surface 11A, the insert nut 53 of the left surface 11C, the insert nut 54 of the front surface 11A, and the insert nut 56 of the right surface 11D, respectively.

At upper-left, lower-left, upper-right, and lower-right corner portions of a rear portion of the outer cover 12, the insert nuts 57 to 68 are embedded in corresponding surfaces of the upper surface 12B, the left surface 12C, the right surface 12D, the rear surface 12E, and the bottom surface 12F. That is, the insert nuts 57 and 60 are embedded in the upper surface 12B, the insert nuts 58 and 63 are embedded in the left surface 12C, the insert nuts 61 and 66 are embedded in the right surface 12D, the insert nuts 59, 62, 64, and 67 are embedded in the rear surface 12E, and the insert nuts 65 and 68 are embedded in the bottom surface 12F. The insert nuts 51 to 68 are provided so as to be spaced apart from the corresponding corner portions of the main body unit 10 by distances the same as each other.

The insert nuts 69 to 72 are spaced apart from the insert nuts 91, 92, 94, and 95, respectively, by predetermined distances equal to one another in a state where the main body unit 10 and the platen unit 20 are assembled together. More specifically, the insert nuts 69 to 72 are provided such that a distance between the insert nuts 69 and 91, a distance between the insert nuts 70 and 92, a distance between the insert nuts 71 and 94, and a distance between the insert nuts 72 and 95 are equal to one another in a state where the main body unit 10 and the platen unit 20 are assembled to each other. Bolts 9 (described later) used to fix the main body unit 10 to the external housing 100 can be fastened to the insert nuts 51 to 72, respectively, whereby the printing device 1 is assembled to the external housing 100.

The operating portion 14 is provided at the front surface 11A of the outer cover 11. The operating portion 14 includes an input portion and a display portion. The input portion is configured to receive operations such as input of various types of information and turning on and off of the printing device 1. The display portion is configured to display various information thereon. A discharge opening 7 is formed on the front surface of the printing device 1 at a position below the operating portion 14. More specifically, the discharge opening 7 is formed between the front surface 11A of the main body unit 10 and a front surface 21A (described later) of the platen unit 20 in a state where the main body unit 10 and the platen unit 20 are assembled to each other. The printing medium is conveyed by the platen roller 2 and is discharged out of the printing device 1 through the discharge opening 7 after printing operation has been performed on the printing medium.

The front surface 11A of the outer cover 11 has a lower end portion forming a part of the discharge opening 7. The front surface 11A has a portion inclined diagonally rearward and downward as approaching an internal space of the discharge opening 7. The main body unit 10 further includes a cutting blade 15 provided near the discharge opening 7 and configured to cut the printing medium after printing operation has been performed thereon. The cutting blade 15 extends in the left-right direction. The cutting blade 15 cuts the printing medium when the printed printing medium is pulled upward, i.e., toward the main body unit 10.

The printing head 3 is disposed rearward of the cutting blade 15. The printing head 3 includes a plurality of heating elements at a lower portion thereof. The plurality of heating elements are arrayed in line in the left-right direction. That is, the printing head 3 extends in the left-right direction in a state where the main body unit 10 and the platen unit 20 are assembled to each other. The printing head 3 is configured to heat the printing medium using the plurality of heating elements in order to print characters on the heat-sensitive label. A heat sink 4 is provided above the printing head 3. The printing head 3 and the heat sink 4 are fixed integrally to each other, and are urged downward due to an urging force of a spring 5.

The main body unit 10 has a lower-front portion serving as an attachment-detachment portion 18 to which the platen unit 20 is attachable and from which the platen unit 20 is detachable. The platen unit 20 can be assembled to the main body unit 10 as a single unit at the attachment-detachment portion 18 of the main body unit 10, and the platen unit 20 can be separated from the main body unit 10 at the attachment-detachment portion 18 as completely separated units. In a state where the platen unit 20 is separated from the main body unit 10, the printing head 3 is exposed to an outside at the attachment-detachment portion 18.

The driving mechanism is a motor (not illustrated) provided at a right portion inside the main body unit 10, and is connected to a main body gear (not illustrated) provided at a lower-front portion of the right portion of the main body unit 10 via a plurality of the gears. In a state where the main body unit 10 and the platen unit 20 are assembled together, the main body gear is in meshing engagement with a platen gear 24 coupled to a right end of the platen roller 2 of the platen unit 20. As such, a rotational driving force of the motor is transmitted to the platen roller 2 via the main body gear and the platen gear 24 to rotate the platen roller 2.

The control board 16 is disposed upward and rearward of the printing head 3. A CPU, a ROM, a RAM, and the like are mounted on the control board 16. The control board 16 is configured to control driving of the printing device 1. The printing device 1 is driven by electrical power supplied from an external power source in the present embodiment. However, the printing device 1 has a rear portion configured to receive a battery, and may be driven by electrical power supplied from a battery attached thereto.

The printing device 1 is formed with a supply opening 8 at a bottom portion thereof. Specifically, the supply opening 8 is provided on the bottom surface of the printing device 1 at a portion between the main body unit 10 and the platen unit 20 assembled together. A portion of the outer cover 12 having the bottom surface 12F is provided as a separate component than another portion of the outer cover 12, and serves as a guide member 13.

The guide member 13 extends frontward from a rear-lower corner portion of the printing device 1, bends toward the supply opening 8 (toward an internal space of the printing device 1), and further extends diagonally frontward and upward to a portion near the printing head 3. The guide member 13 is configured to guide the printing medium inserted through the supply opening 8 to the printing head 3. In a state where the platen unit 20 is separated from the main body unit 10, the guide member 13 is exposed to the outside at the attachment-detachment portion 18.

The main body unit 10 further includes a lever 17 at a left portion thereof. The user operates the lever 17 in order to separate the platen unit 20 assembled to the main body unit 10 from the main body unit 10. The lever 17 causes a pair of engagement portions 19 of the attachment-detachment portion 18 to be moved when operated by the user. The engagement portions 19 are provided at a left-front portion and a right-front portion in the lower portion of the main body unit 10, respectively. That is, the engagement portions 19 are provided outward of the discharge opening 7 in the left-right direction. The engagement portions 19 are configured to engage with a shaft 2A (described later) of the platen roller 2 of the platen unit 20 when the main body unit 10 and the platen unit 20 are assembled to each other.

In a state where the main body unit 10 and the platen unit 20 are assembled to each other and the lever 17 is not operated by the user, the engagement portions 19 are in engagement with the shaft 2A to position the platen roller 2. A spring (not illustrated) is provided on each of the engagement portions 19. In a state where the main body unit 10 and the platen unit 20 are assembled to each other and the lever 17 is not operated by the user, the engagement portions 19 are maintained at a state where the engagement portions 19 are engaged with the shaft 2A due to an urging force generated by the springs. When the lever 17 is operated by the user, the engagement portions 19 become disengaged from the shaft 2A against the urging force generated by the springs, and therefore the platen unit 20 can be separated from the main body unit 10 at the attachment-detachment portion 18.

The platen unit 20 includes the outer cover 21, the platen roller 2, and a guide roller 22. The outer cover 21 constitutes a lower-front portion of the outer shell of the printing device 1, and has the front surface 21A, a left surface 21C, a right surface 21D, and a bottom surface 21F as outer surfaces of the platen unit 20. The front surface 21A constitutes a lower portion of the front surface of the printing device 1. The left surface 21C constitutes a lower-front portion of the left surface of the printing device 1. The right surface 21D constitutes a lower-front portion of the right surface of the printing device 1. The bottom surface 21F constitutes a front portion of the bottom surface of the printing device 1. The front surface 21A crosses the first direction. The left surface 21C and the right surface 21D both cross the left-right direction. The bottom surface 21F crosses the up-down direction. In a state where the main body unit 10 and the platen unit 20 are assembled to each other, the front surface 21A is positioned opposite the rear surface 12E in the front-rear direction, and the bottom surface 21F is positioned opposite the upper surface 11B in the up-down direction. Also, in this state, the bottom surface 21F is positioned on the same side as the bottom surface 12F in the up-down direction.

At left-front and right-front corner portions of a lower portion of the outer cover 21, the insert nuts 91 to 96 are embedded in corresponding surfaces of the front surface 21A, the left surface 21C, the right surface 21D, and the bottom surface 21F. That is, the insert nuts 91 and 94 are embedded in the front surface 21A, the insert nut 92 is embedded in the left surface 21C, the insert nut 95 is embedded in the right surface 21D, and the insert nuts 93 and 96 are embedded in the bottom surface 21F. The insert nuts 91 to 96 are provided so as to be spaced apart from the corresponding corner portions of the platen unit 20 by distances the same as each other. The distances between the insert nuts 91 to 96 and the corner portions corresponding thereto are equal to the distances between the insert nuts 51 to 68 and the corner portions corresponding thereto. Bolts 9 used to fix the platen unit 20 to the external housing 100 to which the printing device 1 is assembled can be fastened to the respective insert nuts 91 to 96.

The front surface 21A of the outer cover 21 has an upper end portion forming a part of the discharge opening 7. The front surface 21A has a portion inclined diagonally rearward and upward toward the discharge opening 7. The platen unit 20 further includes a cutting blade 25 provided near the discharge opening 7. The cutting blade 25 is configured to cut the printing medium having an image printed thereon. The cutting blade 25 extends in the left-right direction, and is used to cut the printing medium when the printing medium is pulled downward, i.e., toward the platen unit 20.

The platen roller 2 has a solid cylindrical shape. The platen roller 2 extends in the left-right direction in a state where the platen unit 20 and the main body unit 10 are assembled to each other. The platen roller 2 includes the shaft 2A extending in the left-right direction. The shaft 2A has left and right ends protruding outward of the platen roller 2. The left and right ends of the shaft 2A are supported rotatably at an upper portion inside the platen unit 20. When the main body unit 10 and the platen unit 20 are assembled to each other, the platen roller 2 is positioned close to the plurality of heating elements of the printing head 3. In a case where the printing medium is placed between the printing head 3 and the platen roller 2, the printing head 3 presses the printing medium against the platen roller 2 due to the urging force of the spring 5. Accordingly, the platen roller 2 can nip the printing medium in cooperation with the printing head 3 and convey the same by rotation thereof.

The platen gear 24 (see FIG. 3) is coupled to the right end of the shaft 2A. When the main body unit 10 and the platen unit 20 are assembled to each other, the platen gear 24 is in meshing engagement with the main body gear of the main body unit 10. The platen roller 2 is configured to convey the printing medium nipped between the platen roller 2 and the printing head 3 by rotating due to a driving force of the motor of the main body unit 10.

The guide roller 22 is provided at a position rearward and downward of the platen roller 2. The guide roller 22 is a roller including a plurality of circular-shaped flange portions arranged in the left-right direction. The guide roller 22 is disposed such that the guide roller 22 is positioned close to an approximate center portion in the up-down direction of the guide member 13 of the main body unit 10 with a gap between the guide roller 22 and the guide member 13 when the platen unit 20 and the main body unit 10 are assembled to each other. The guide roller 22 forms a path (a conveying path T described later) between the guide roller 22 and the guide member 13 such that the printing medium inserted through the supply opening 8 is guided by the guide member 13 of the main body unit 10 toward the printing head 3.

Of the outer cover 21 of the platen unit 20, a portion having the bottom surface 21F is provided as a separate component than another portion of the outer cover 21, and functions as a guide member 23. The guide member 23 extends rearward from a lower-front corner portion of the outer cover 21 and bends toward the supply opening 8, and further extends rearward and upward toward the guide roller 22. The guide member 23 is configured to guide the printing medium toward the guide roller 22 such that the printing medium that have reached the guide roller 22 is guided to the printing head 3 by the guide member 13 of the main body unit 10.

Figure 2:
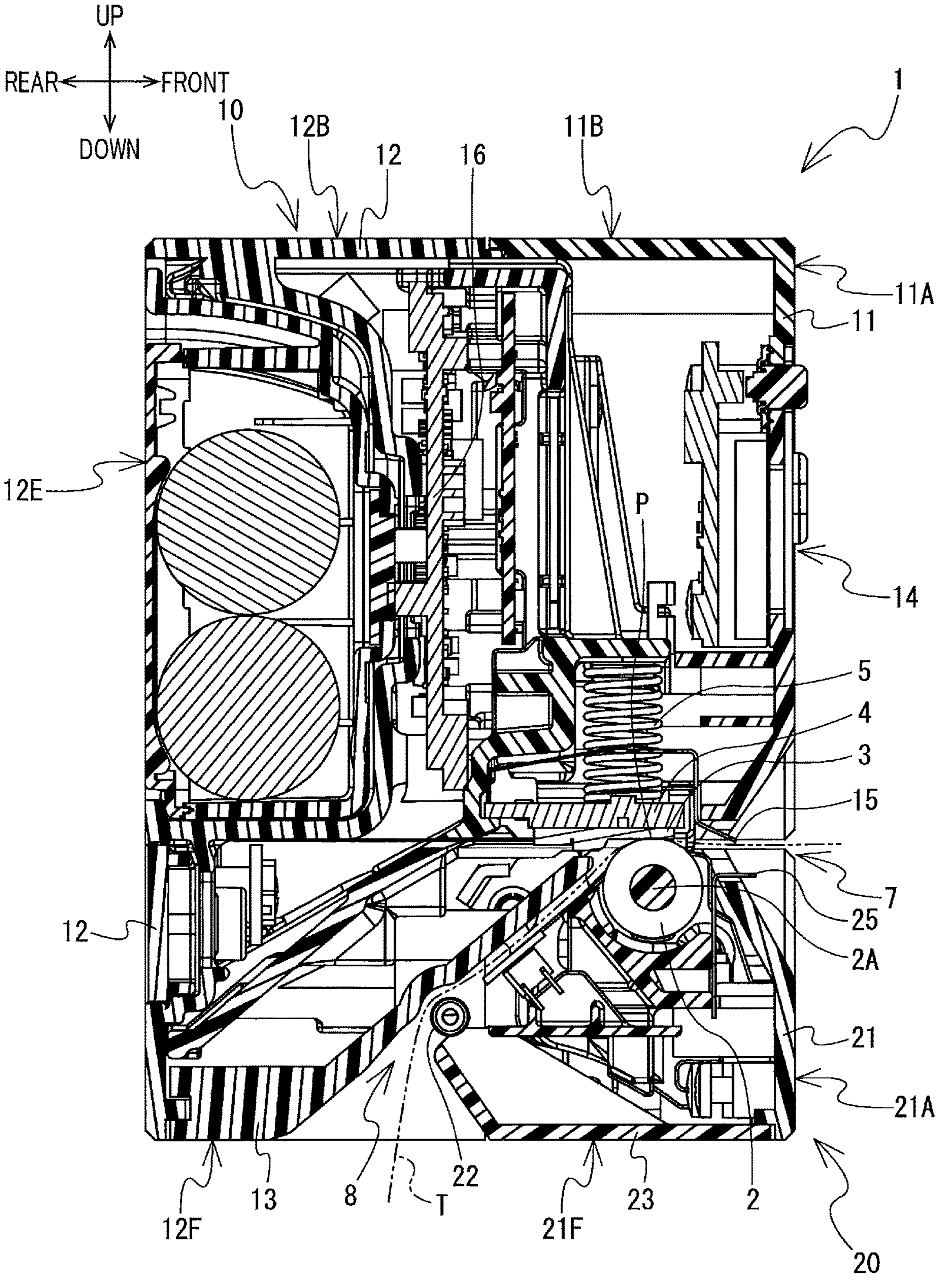
FIG. 2 is a vertical cross-sectional view of the printing device 1 as viewed from the left side thereof.

As illustrated in FIG. 2, in a state where the main body unit 10 and the platen unit 20 are assembled to each other, the platen roller 2 is in contact with the printing head 3 from below. Hereinafter, the position at which the platen roller 2 is in contact with the printing head 3 will be referred to as "printing position P". The printing position P is a position at which an image is formed on the heat-sensitive label when the plurality of heating elements generates heat while the printing medium is nipped between the platen roller 2 and the printing head 3.

The printing medium is guided by the guide member 13, the guide member 23, and the guide roller 22 to be conveyed toward the printing head 3 through the supply opening 8. The conveying path T along which the printing medium is conveyed extends diagonally frontward and upward from the supply opening 8. Furthermore, the conveying path T is bended frontward at a position near a rear portion of the printing head 3, passes through the printing position P, and extends frontward toward the discharge opening 7. The platen roller 2 is positioned on the conveying path T at the printing position P. As illustrated in FIG. 4, in a state where the platen unit 20 is separated from the main body unit 10, the conveying path T of the printing medium is exposed to the outside at the attachment-detachment portion 18 of the main body unit 10.

Next, the positions at which the insert nuts 51 to 72 of the main body unit 10 are provided and the insert nuts 91 to 96 of the platen unit 20 are provided will be described. The insert nuts 51 to 68 are provided so as to be spaced apart from the corresponding corner portions by the distances the same as each other. The insert nut 51 is positioned rightward and away from the left-front corner portion of the upper portion of the outer cover 11 by a distance A, and downward and away from the same corner portion by the distance A. The same is applied to the insert nuts 52 to 68. Specifically, the insert nuts 52 to 68 are provided in the corresponding surfaces at positions spaced apart from the corresponding corner portions by the distance A in two directions of the left-right direction, the front-rear direction, the up-down direction. With this configuration, the user can easily change orientations for assembling the printing device 1 to the external housing 100.

For example, in order to assemble the printing device 1 to the external housing 100, first the corner portions of the printing device 1 are positioned relative to corresponding corner portions inside the external housing 100. Bolts 9 are inserted into one or more holes formed in the external housing 100 at positions corresponding to the insert nuts 51 to 68 and is fastened to the corresponding insert nuts. In this case, in order to change orientation for assembling the printing device 1 relative to the external housing 100, another corner portions of the printing device 1 are positioned relative to the corresponding corner portions inside the external housing 100, whereby the printing device 1 can be fixed to the external housing 100 by fastening bolts 9 to the corresponding insert nuts through the holes already formed in the external housing 100.

Figure 1:
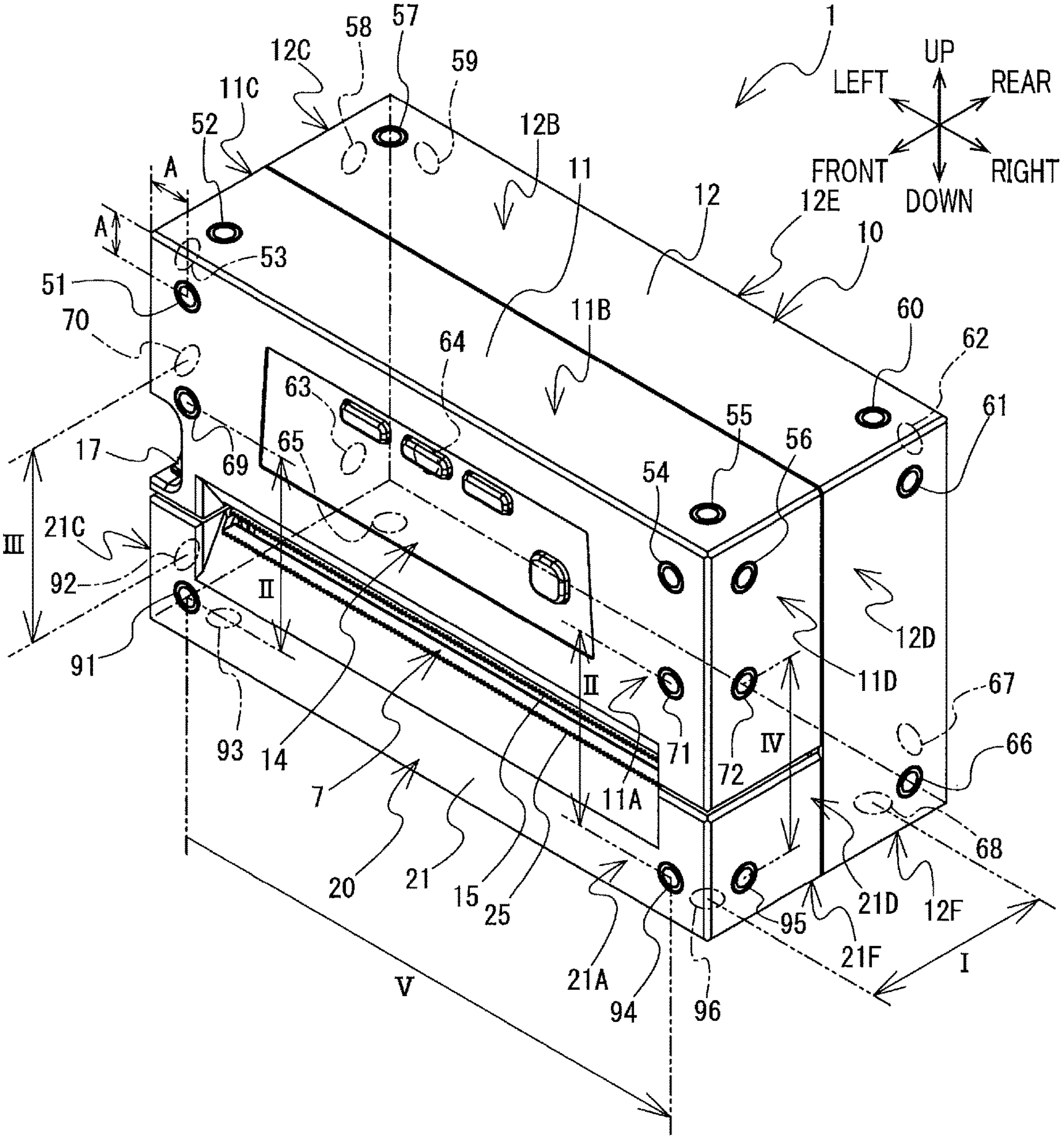
FIG. 1 is a front perspective view of a printing device 1 as viewed from the right-front side thereof.

The insert nuts 91 to 96 of the platen unit 20 are provided at positions symmetrical to the insert nuts 69, 70, 65, 71, 72, and 68 of the main body unit 10, respectively, with respect to a position between the main body unit 10 and the platen unit 20 assembled to each other. Specifically, as illustrated in FIG. 1, the insert nuts 93 and 96 of the bottom surface 21F are provided so as to be spaced apart from the insert nuts 65 and 68 of the bottom surface 12F, respectively, by a distance I in the front-rear direction. The insert nuts 91 and 94 of the front surface 21A are provided so as to be spaced apart from the insert nuts 69 and 71 of the front surface 11A, respectively, by a distance II in the up-down direction.

The insert nut 92 of the left surface 21C and the insert nut 70 of the left surface 11C are provided so as to be spaced apart from each other by a distance III in the up-down direction. The insert nut 95 of the right surface 21D and the insert nut 72 of the right surface 11D are provided so as to be spaced apart from each other by a distance IV in the up-down direction. The distances I, II, III, and IV are equal to one another. With this configuration, the user can easily change orientations for assembling the printing device 1 to the external housing 100.

For example, the main body unit 10 and the platen unit 20 are fixed to the external housing using any of the insert nuts provided symmetrically as described above in the front surface, the left surface, the right surface, and the bottom surface of the printing device 1. In this case, if the user changes orientation of the printing device in order to change a surface of the printing device 1 used to fix the printing device 1 to the external housing, the user can fix the printing device 1 to the external housing by fastening bolts to the symmetrical insert nuts provided in the main body unit 10 and the platen unit 20 through the two holes formed in advance in the external housing.

At each of the front surface, the upper surface, the rear surface, and the bottom surface of the printing device 1, two insert nuts that are spaced apart from each other in the left-right direction are provided as a pair of insert nuts. Specifically, the insert nuts 91 and 94 of the front surface 21A are provided as a pair of insert nuts so as to be spaced apart from each other by a distance V in the left-right direction. The insert nuts 51 and 54 of the front surface 11A are provided as a pair of insert nuts and are spaced apart from each other by the distance V in the left-right direction. The insert nuts 69 and 71 are also provided as a pair of insert nuts at the front surface 11A so as to be spaced apart from each other by the distance V in the left-right direction.

The insert nuts 52 and 55 of the upper surface 11B are provided as a pair of insert nuts so as to be spaced apart from each other by the distance V in the left-right direction. The insert nuts 57 and 60 of the upper surface 12B are provided as a pair of insert nuts so as to be spaced apart from each other by the distance V in the left-right direction. The insert nuts 59 and 62 of the rear surface 12E are provided as a pair of insert nuts so as to be spaced apart from each other by the distance V in the left-right direction. Similarly, the insert nuts 64 and 67 are provided in the rear surface 12E as a pair of insert nuts so as to be spaced apart from each other by the distance V in the left-right direction. The insert nuts 93 and 96 of the bottom surface 21F are provided as a pair of insert nuts so as to be spaced apart from each other by the distance V in the left-right direction. The insert nuts 65 and 68 of the bottom surface 12F are provided as a pair of insert nuts so as to be spaced apart from each other by the distance V in the left-right direction. With this configuration, the user can easily change orientations for assembling the printing device 1 to the external housing.

For example, two bolts are inserted into any of the pairs of insert nuts spaced apart from each other by the distance V in the left-right direction provided at the front surface, the upper surface, the rear surface, and the bottom surface of the printing device 1. In this case, if the user changes orientation of the printing device 1 to change a surface of the printing device 1 used to fix the printing device 1 to the external housing, the user can fix the printing device 1 to the external housing by fastening bolts to the selected pair of insert nuts spaced apart from each other by the distance V in the left-right direction through respective two holes formed in the external housing in advance.

Next, examples of assembly of the printing device 1 to the external housing 100 will be described. The printing device 1 can be assembled to various kinds of the external housing 100 to be used in the same. The external housing 100 illustrated in FIG. 5 includes an upper housing 110 and a lower housing 120 each having a parallelepiped (box like) shape. The upper housing 110 and the lower housing 120 can be separated in the up-down direction. The upper housing 110 has a lower portion formed with an opening, and the main body unit 10 can be assembled to an internal space of the upper housing 110. The internal space of the upper housing 110 has a dimension in the left-right direction the same as a dimension in the left-right direction of the main body unit 10.

The upper housing 110 has a front surface whose lower end portion is formed with a notch portion 111 extending in the left-right direction. An opening 112 is also formed in the front surface of the upper housing 110 at a position above the notch portion 111. The upper housing 110 also has a left surface and a right surface. A screw hole is formed at an upper-front portion of each of the left surface and the right surface of the upper housing 110.

In this example, the main body unit 10 is accommodated in the internal space of the upper housing 110, and the bolts 9 are inserted through the screw holes formed in the upper housing 110 and fastened to the insert nut 53 of the left surface 11C and the insert nut 56 of the right surface 11D, respectively. As a result, the main body unit 10 is assembled to the upper housing 110, the operating portion 14 is exposed to an outside of the external housing 100 through the opening 112, and a portion of the main body unit 10 constituting the discharge opening 7 is arranged at the notch portion 111.

The lower housing 120 has an upper portion formed with an opening, and the platen unit 20 can be assembled to an internal space of the lower housing 120. A dimension in the left-right direction of the internal space of the lower housing 120 is the same as a dimension in the left-right direction of the platen unit 20. The lower housing 120 has a front surface formed with a notch portion 121 extending in the left-right direction similar to the upper housing 110. The notch portion 121 is formed on an upper end portion of the front surface of the lower housing 120. The lower housing 120 has a left surface and a right surface, and a screw hole is formed in an upper-front portion of each of the left surface and the right surface.

In a state where the platen unit 20 is disposed in the internal space of the lower housing 120, the bolts 9 inserted through the screw holes formed in the left surface and the right surface of the lower housing 120 are fastened to the insert nut 92 of the left surface 21C and the insert nut 95 of the right surface 21D, respectively. In this way, the platen unit 20 is assembled to the internal space of the lower housing 120, and a portion of the platen unit 20 constituting the discharge opening 7 is arranged at the notch portion 121.

Since the lower housing 120 has a shape elongated in the up-down direction, the lower housing 120 can accommodate therein a roll M formed by winding the printing medium. The printing medium paid out of the roll M is drawn out of the lower housing 120 through the notch portion 121, and is arranged on a portion of the conveying path T (see FIG. 2) constituted by the platen unit 20 so as to cover the platen unit 20 assembled to the lower housing 120. In this state, the upper housing 110 is moved to cover the lower housing 120 such that the platen unit 20 is positioned at the attachment-detachment portion 18 of the main body unit 10. Accordingly, the shaft 2A of the platen roller 2 and the engagement portions 19 are brought into engagement with each other, whereby the main body unit 10 and the platen unit 20 are assembled together as a single unit.

At this time, the upper housing 110 is arranged on the lower housing 120. The notch portion 111 of the upper housing 110 and the notch portion 121 of the lower housing 120 form an opening portion of the external housing 100, and therefore the discharge opening 7 of the printing device 1 is exposed to the outside through the opening portion. In this way, the user can be provided with a service using the external housing 100 to which the printing device 1 is assembled and having the front surface allowing the printed printing medium is discharged therethrough.

Note that, for the purpose of assembling the printing device 1 to the external housing 100, each of the front surface of the upper housing 110 and the front surface of the lower housing 120 may be formed with two screw holes (that is, four screw holes in total may be formed in the front surface of the external housing 100). In this case, four of the bolts 9 are inserted through the screw holes formed in the front surface of the external housing 100, and are fastened to the insert nuts 51 and 54 of the front surface 11A and the insert nuts 91 and 94 of the front surface 21A, respectively. Accordingly, the main body unit 10 is assembled to the upper housing 110, and the platen unit 20 is assembled to the lower housing 120. As described above, the positions to which the bolts 9 are inserted and fastened can be appropriately changed while orientation of the printing device 1 when assembled to the external housing 100 is not changed.

Next, an external housing 200 will be described with reference to FIG. 6. The external housing 200 has a tray-like shape. The external housing 200 has an upper portion formed with an opening, and the main body unit 10 can be assembled to a rear portion of an internal space of the external housing 200. A dimension in the left-right direction of the internal space of the external housing 200 is the same as the dimension in the left-right direction of the main body unit 10. The external housing 200 has a left surface and a right surface each formed with a pair of screw holes at a rear portion thereof.

In order to assemble the printing device 1 to the external housing 200, the main body unit 10 is placed inside the external housing 200 such that the rear surface 12E of the main body unit 10 is directed downward. In this state, four of the bolts 9 are inserted through the respective screw holes formed in the left surface and the right surface of the external housing 200 and fastened to the insert nuts 58 and 63 of the left surface 12C and the insert nuts 61 and 66 of the right surface 12D, respectively. Therefore, the main body unit 10 is assembled to the internal space of the external housing 200 such that the discharge opening 7 is directed upward. The platen unit 20 assembled to the main body unit 10 is exposed to the outside (see FIG. 6).

The printing medium can be placed in the external housing 200 at a position frontward of the printing device 1 (i.e., a front portion of the external housing 200). For example, the printing medium is a fanfold paper N formed by folding a heat-sensitive label having an elongated shape. In a state where the platen unit 20 is separated from the main body unit 10, the user arranges the printing medium paid out of the fanfold paper N on a portion of the conveying path T constituted by the main body unit 10 (see FIG. 2). In this state, the platen unit 20 is disposed at the attachment-detachment portion 18 of the main body unit 10. The shaft 2A of the platen roller 2 is brought engagement with the engagement portions 19, whereby the main body unit 10 and the platen unit 20 are assembled to each other as a single unit. The discharge opening 7 is positioned above the external housing 200. In this way, the user can be provided with a service using the external housing 200 to which the printing device 1 is assembled and through which the printing medium having an image printed thereon is discharged upward.

Although not illustrated in the drawings, an upper cover having a tray-like shape may be employed for use with the external housing 200. When placed on the external housing 200, the upper cover can cover the printing device 1 as a whole. The platen unit 20 may be assembled to the upper cover. The upper cover has an opening portion that allows the operating portion 14 and the discharge opening 7 to the outside therethrough. With this configuration, when the main body unit 10 and the platen unit 20 are assembled together, the printing device 1 can be covered with the external housing 200 and the upper cover.

As described above, in the printing device 1, the main body unit 10 and the platen unit 20 can be completely separated from each other and can be assembled to each other. With this configuration, freedom of layout of the printing device 1 in the external housing can be improved. Also, operation for replacing the printing medium can be easily performed since the main body unit 10 and the platen unit 20 can be completely separated from each other. Furthermore, the insert nuts for fixing the printing device 1 to the external housing 100 are provided at both the main body unit 10 and the platen unit 20. Hence, depending on the use of the external housing 100, the main body unit 10 can be fixed to the external housing 100, or the platen unit 20 can be fixed to the external housing 100. Since the freedom of layout of the printing device 1 inside the external housing 100 can be attained, a designer of the external housing 100 can freely design the external housing 100 according to the use thereof.

The insert nuts 51 to 72 for fixing the printing device 1 to the external housing 100 are provided in the plurality of surfaces of the outer covers 11 and 12 of the main body unit 10. Accordingly, in a case where the main body unit 10 is fixed to the external housing 100, the designer of the external housing 100 can appropriately select the surfaces of the main body unit 10 used to fix the main body unit 10 to the external housing 100, and therefore the freedom of layout of the printing device 1 inside the external housing 100 can be enhanced. Further, since the main body unit 10 is fixed to the external housing 100 using the plurality of surfaces in the outer covers 11 and 12 of the main body unit 10, fixing of the main body unit 10 to the external housing 100 can be more surely attained.

The insert nuts 91 to 96 for fixing the printing device 1 to the external housing 100 are provided in the plurality of surfaces of the outer cover 21 of the platen unit 20. Hence, in a case where the platen unit 20 is fixed to the external housing 100, the designer of the external housing 100 can appropriately select the surfaces of the platen unit 20 used to fix the platen unit 20 to the external housing 100. Consequently, the freedom of layout of the printing device 1 inside the external housing 100 can be improved. Further, since the plurality of surfaces of the outer cover 21 in the platen unit 20 is used to fix the platen unit 20 to the external housing 100, the platen unit 20 can be more surely fixed to the external housing 100.

In a case where fixing portions for fixing the printing device 1 to the external housing 100 (i.e., screw holes) are provided at the external housing 100 such that the printing device 1 is fixed relative to the external housing 100 from both sides in the left-right direction of the printing device 1, selected one of the main body unit 10 and the platen unit 20 can be fixed to the external housing 100 using the fixing portions provided in the external housing 100. That is, one of the main body unit 10 and the platen unit 20 is appropriately selected to be fixed to the single fixing portion of the external housing 100 depending on the intended use of the external housing 100. Thus, the designer of the external housing 100 can freely design the external housing 100 depending on the use thereof.

In a case where fixing portions for fixing the printing device 1 to the external housing 100 are provided at the external housing 100 such that the printing device 1 is fixed in the up-down direction or in the front-rear direction, the upper surface 11B or the rear surface 12E of the outer covers 11 and 12 of the main body unit 10 can be fixed to the external housing 100 using the fixing portions. Further, the front surface 21A or the bottom surface 21F of the outer cover 21 of the platen unit 20 can be fixed to the external housing 200 through the fixing portions in this case. In this way, one of the main body unit 10 and the platen unit 20 is appropriately selected to be fixed to the fixing portions depending on the use of the external housing 100, thereby enabling the designer of the external housing 100 to freely design the external housing 100 depending on the use thereof.

In a case where the main body unit 10 is fixed to the external housing 100, the insert nuts 51, 54, 69, and 71 provided at the front surface 11A forming the discharge opening 7 can be used. Hence, the notch portion 111 of the upper housing 110 that serves as a discharge opening of the printed printing medium in the external housing 100 can be easily placed at a position corresponding to the discharge opening 7. Moreover, since the notch portion 111 is hard to be deviated relative to the notch portion 111 in this case, the printing medium can be easily cut after the printing operation is performed.

Similarly, in a case where the platen unit 20 is fixed to the external housing 100, the platen unit 20 can be fixed thereto using the insert nuts 91 and 94 provided in the front surface 21A constituting the discharge opening 7. Accordingly, the notch portion 121 that configures a discharge opening for the printed printing medium in the external housing 100 can be easily positioned at a position corresponding to the discharge opening 7. Since deviation of the position of the discharge opening 7 relative to the notch portion 121 hardly occurs, cutting operation with respect to the printed printing medium can be easily performed.

The insert nuts 51 to 72 and the insert nuts 91 to 96 for fixing the printing device 1 to the external housing 100 are provided at the plurality of surfaces of the outer covers 11 and 12 of the main body unit 10 and the plurality surfaces of the outer cover 21 of the platen unit 20, respectively. As such, in a case where selected at least one of the main body unit 10 and the platen unit 20 is fixed to the external housing 100, the designer of the external housing 100 can freely select the surfaces of the printing device 1 used to fix the at least one of the main body unit 10 and the platen unit 20 to the external housing 100, and the freedom of layout of the printing device 1 in the external housing 100 can be improved.

Further, since the main body unit 10 and the platen unit 20 are fixed to the external housing 100 using the plurality of surfaces of the outer covers 11 and 12 of the main body unit 10 and the plurality of surfaces of the outer cover 21 of the platen unit 20, the main body unit 10 and the platen unit 20 can be more surely fixed to the external housing 100.

The respective distances between the positions of the insert nuts 63, 66, 69, 71, 70, and 72 at the surfaces of the main body unit 10 and the respective positions of the insert nuts 92, 95, 91, 94, 92, and 95 at the surfaces of the platen unit 20 are the same as one another. With this positional relationship, the printing device 1 can be fixed to the external housing 100 even when any one of combination of the left surface 12C and the left surface 21C, combination of the right surface 12D and the right surface 21D, and combination of the front surface 11A and the front surface 21A is used to fix the printing device 1 to the external housing 100 through the fixing portions in the external housing 100. Hence, the designer of the external housing 100 can freely design the external housing 100 depending on the use of the external housing 100.

By providing two fixing portions spaced apart from each other by the distance V at the external housing 100, one of the rear surface 12E, the upper surface 11B, the upper surface 12B, the bottom surface 12F, and the front surface 11A of the main body unit 10, the bottom surface 21F, and the front surface 21A of the platen unit 20 can be used to fix the printing device 1 to the external housing 100 through the fixing portions. Hence, the designer of the external housing 100 can freely design the external housing 100 according to the intended use thereof.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the printing device 1 includes the plurality of insert nuts 51 to 72, and 91 to 96, the printing device 1 may not include all of these insert nuts. For example, one insert nut may be provided at each of the main body unit 10 and the platen unit 20. Alternatively, a pair of insert nuts may be provided at each of the main body unit 10 and the platen unit 20. A plurality of metal fixtures may be provided in the printing device 1 instead of the insert nuts 51 to 72, and 91 to 96. The way of providing insert nuts is not limited to the insert molding, and alternatively, the nuts may be provided by fixing the nuts to the outer covers 11, 12, and 21 through an adhesion or an insertion. Further, the printing device 1 may be fixed to the external housing 100 by fastening a plurality of bolts 9 to a plurality of insert nuts, respectively, instead of using one insert nut or two insert nuts.

REMARKS

The printing device 1 is an example of the printing device. The main body unit 10 is an example of the first unit. The printing head 3 is an example of the printing head. The roll M and the fanfold paper N are examples of the printing medium. The front surface 11A, the upper surface 11B, the left surface 11C, the right surface 11D, the upper surface 12B, the left surface 12C, the right surface 12D, the rear surface 12E, and the bottom surface 12F are examples of the outer surfaces of the first unit. The platen unit 20 is an example of the second unit. The platen roller 2 is an example of the platen roller. The front surface 21A, the left surface 21C, the right surface 21D, and the bottom surface 21F are examples of the outer surfaces of the second unit. The insert nuts 51 to 72 are examples of the first fixing member. The insert nuts 91 to 96 are examples of the second fixing member. The external housings 100 and 200 are examples of the external housing. The left-right direction is an example of the first direction. The left surface 11C and the left surface 12C are an example of the first surface of the first unit. The right surface 11D and the right surface 12D are an example of the second surface of the first unit. The left surface 21C is an example of the third surface of the second unit. The right surface 21D is an example of the fourth surface of the second unit. The front-rear direction and the up-down direction are examples of the second direction. The upper surface 11B and the rear surface 12E are another examples of the first surface of the first unit. In this case, the front surface 21A and the bottom surface 21F are examples of the second surface of the second unit. The front surface 11A is another example of the first surface of the first unit, and in this case, the front surface 21A is also an example of the second surface of the second unit. The discharge opening 7 is an example of the discharge opening. The front surface 11A is also an example of the third surface of the first unit. The rear surface 12E is also an example of the fourth surface of the first unit. The upper surface 11B and the upper surface 12B are also an example of the fifth surface of the first unit. The bottom surface 12F is also an example of the sixth surface of the first unit. The up-down direction is also an example of the third direction. The left surface 21C is also an example of the seventh surface of the second unit. The right surface 21D is also an example of the eighth surface of the second unit. The front surface 21A is also an example of the ninth surface of the second unit. The bottom surface 21F is also an example of the tenth surface of the second unit. The distance I is an example of the first distance. The distance II is an example of the second distance. The distance III is an example of the third distance. The distance IV is an example of the fourth distance. The insert nuts 51, 52, 54, 55, 57, 59, 60, 62, 64, 65, 67, 68, 69, and 71 are also examples of the third fixing member. The insert nuts 91, 93, 94, and 96 are also examples of the fourth fixing member. The distance V is another example of the first distance.

What is claimed is:

1. A printing device comprising:

a first unit comprising a printing head configured to perform printing on a printing medium, the first unit having a plurality of outer surfaces; and a second unit comprising a platen roller configured to nip the printing medium in cooperation with the printing head for printing and to convey the printing medium, the second unit having a plurality of outer surfaces, wherein the first unit further has a first fixing member for fixing the first unit to an external housing, the first fixing member being provided at at least one of the plurality of outer surfaces of the first unit, wherein the second unit further has a second fixing member for fixing the second unit to the external housing, the second fixing member being provided at at least one of the plurality of outer surfaces of the second unit, wherein the first unit and the second unit can be assembled to each other and can be separated from each other, wherein, in a state where the first unit and the second unit are assembled to each other, the printing head and the platen roller both extend in a first direction, wherein the plurality of outer surfaces of the first unit comprises:

a first surface crossing the first direction;

a second surface crossing the first direction;

a third surface crossing a second direction crossing the first direction;

a fourth surface positioned opposite the third surface in the second direction;

a fifth surface crossing a third direction crossing both the first direction and the second direction; and a sixth surface crossing the third direction, wherein the plurality of outer surfaces of the second unit comprises:

a seventh surface crossing the first direction;

an eighth surface crossing the first direction;

a ninth surface; and a tenth surface positioned on the same side as the sixth surface in the third direction in a state where the first unit and the second unit are assembled to each other, wherein, in a state where the first unit and the second unit are assembled to each other, the first unit and the second unit form a discharge opening between the third surface and the ninth surface, the discharge opening allowing the printing medium to be discharged therethrough, wherein the first fixing member is provided at each of the first surface, the second surface, the third surface, the fourth surface, the fifth surface, and the sixth surface, and wherein the second fixing member is provided at each of the seventh surface, the eighth surface, the ninth surface, and the tenth surface.

2. The printing device according to claim 1, wherein the first fixing member is provided at each of at least two of the plurality of outer surfaces of the first unit.

3. The printing device according to claim 1, wherein the second fixing member is provided at each of at least two of the plurality of outer surfaces of the second unit.

4. The printing device according to claim 1, wherein the ninth surface of the second unit is positioned opposite the fourth surface of the first unit in the second direction in a state where the first unit and the second unit are assembled to each other.

5. The printing device according to claim 4, wherein the tenth surface of the second unit is positioned opposite the fifth surface of the first unit in the third direction in a state where the first unit and the second unit are assembled to each other.

6. The printing device according to claim 1, wherein the first fixing member provided at the sixth surface and the second fixing member provided at the tenth surface are spaced apart from each other by a first distance, wherein the first fixing member provided at the third surface and the second fixing member provided at the ninth surface are spaced apart from each other by a second distance, wherein the first fixing member provided at the first surface and the second fixing member provided at the seventh surface are spaced apart from each other by a third distance, wherein the first fixing member provided at the second surface and the second fixing member provided at the eighth surface are spaced apart from each other by a fourth distance, and wherein the first distance, the second distance, the third distance, and the fourth distance are equal to one another.

7. The printing device according to claim 1, wherein the first unit further has a third fixing member for fixing the first unit to the external housing, wherein the second unit further has a fourth fixing member for fixing the second unit to the external housing, wherein the third fixing member is provided at each of the third surface, the fourth surface, the fifth surface, and the sixth surface, wherein the fourth fixing member is provided at each of the ninth surface and the tenth surface, wherein in each of the third surface, the fourth surface, the fifth surface, and the sixth surface, the first fixing member and the third fixing member are spaced apart from each other in the first direction by a first distance, and wherein in each of the ninth surface and the tenth surface, the second fixing member and the fourth fixing member are spaced apart from each other in the first direction by the first distance.

* * * * *